(12) United States Patent
Yang et al.

(10) Patent No.: US 9,718,991 B2
(45) Date of Patent: Aug. 1, 2017

(54) CHEMICAL MECHANICAL POLISHING SLURRY

(71) Applicant: UWiZ Technology Co., Ltd., Taoyuan (TW)

(72) Inventors: Yi Han Yang, Taoyuan (TW); Wen Cheng Liu, Taoyuan (TW); Ming Che Ho, Taoyuan (TW); Ming Hui Lu, Taoyuan (TW); Song Yuan Chang, Taoyuan (TW)

(73) Assignee: UWIZ TECHNOLOGY CO., LTD., Taoyuan (TW)

( * ) Notice: Subject to any disclaimer, the term of this patent is extended or adjusted under 35 U.S.C. 154(b) by 0 days.

(21) Appl. No.: 14/723,488

(22) Filed: May 28, 2015

(65) Prior Publication Data

US 2016/0347971 A1    Dec. 1, 2016

(30) Foreign Application Priority Data

Feb. 5, 2015   (TW) .............................. 104103884 A

(51) Int. Cl.
*C09G 1/02*       (2006.01)
*C09K 3/14*       (2006.01)

(52) U.S. Cl.
CPC .............. *C09G 1/02* (2013.01); *C09K 3/1463* (2013.01)

(58) Field of Classification Search
CPC ....................................................... C09G 1/02
See application file for complete search history.

(56) References Cited

U.S. PATENT DOCUMENTS

| 2008/0105652 A1* | 5/2008 | Brusic ...................... C09G 1/02 216/89 |
| 2008/0237535 A1* | 10/2008 | Maejima .................. C09G 1/02 252/79.1 |
| 2010/0248479 A1* | 9/2010 | McDevitt ............ H01L 21/3212 438/693 |
| 2014/0127983 A1 | 5/2014 | Wang |

FOREIGN PATENT DOCUMENTS

| CN | 102408871 | * 11/2013 | ............... C09K 3/14 |
| KR | 1020150036909 | * 4/2015 | ............... C09K 3/14 |

OTHER PUBLICATIONS

Translated equivalent abstract of KR 1020150036909 from EAST Search (2015).*
Machine Translation KR1020150036909 (2015).*
CN 102408871 Translated Abstract, (2016) (3 pages).*

* cited by examiner

*Primary Examiner* — Nadine Norton
*Assistant Examiner* — Mahmoud Dahimene
(74) *Attorney, Agent, or Firm* — JMB Davis Ben-David

(57) ABSTRACT

A chemical mechanical polishing slurry for polishing a stainless steel substrate is provided, which comprises a content 10~50 wt % of abrasive particles, a content 0.001~2.0 wt % of a coolant, a content 0.001~1.0 wt % of an oxidant, a content 10~5000 ppm of a lubricity improver, and a content 10~5000 ppm of a foam inhibitor. A particle size of the abrasive particles is in a range of 20~500 nm. The alkaline polishing slurry according to the present invention is capable of increasing the polishing performance, surface quality, and surface passivation effect after the chemical-mechanical polishing process.

8 Claims, No Drawings

CHEMICAL MECHANICAL POLISHING SLURRY

FIELD OF THE INVENTION

The present invention relates to a chemical mechanical polishing slurry composition, and in particular to, a polishing composition for polishing a stainless steel substrate.

BACKGROUND OF THE INVENTION

In the past, a smooth surface of a stainless steel substrate is generally obtained by applying chemical force such as acid etching during a chemical mechanical polishing treatment, or by applying mechanical force with hard wear-resistant particles, such as alumina, silicon carbide, or silicon oxide, on the surface of the stainless steel. Besides, in US patent US20140127983 A1 and a publication document "Advances in the materials science and engineering synthesis and characterization of $SiO_2$ nanoparticles and their efficacy in chemical mechanical polishing steel Substrate" disclosed by Kao et al., there is no disclosure of a polishing slurry being modulated with chemical formulations during the chemical mechanical polishing process.

In addition, in the existing prior art, most of the polishing slurries used for polishing the stainless steel substrate are adopted with acidic metal polishing liquids, which are usually unable to provide an excellent polishing performance on the stainless steel substrates.

However, in a fine polishing process for chemical mechanical polishing, in addition to using a fine polishing slurry to reach the surface finishing and to improve the surface flatness of the stainless steel substrate, some developing works such as removing and repairing scratches or other surface defects remaining from a rough polishing step are also required, so as to obtain a perfectly polished surface of the substrate.

SUMMARY OF THE INVENTION

In order to solve the aforementioned drawbacks, an objective of the present invention is to provide a chemical mechanical polishing slurry which is able to polish a stainless steel substrate rapidly, so as to achieve a polished surface thereof with mirror polishing and defect-free effects.

To achieve the above invention objective, a chemical mechanical polishing slurry of the present invention comprises: abrasive particles, a coolant, an oxidant, a lubricity improver, and a foam inhibitor. Based on the total weight of the chemical mechanical polishing slurry, a content of the abrasive particles is in a range of 10 wt % to 50 wt %, a content of coolant is in a range of 0.001 wt % to 2.0 wt %, a content of the oxidant is in a range of 0.001 wt % to 1.0 wt %, contents of the lubricity improver and the foaming inhibitor are both in a range of 10 to 5000 ppm, and a particle size of the abrasive particles is between 20 nm and 500 nm.

According to an embodiment of the present invention, the chemical mechanical polishing slurry further comprises an alkaline pH adjusting agent. A pH value of the chemical mechanical polishing slurry can be adjusted from 8.5 to 13.5 by adding the alkaline pH adjusting agent therein.

According to another embodiment of the present invention, the chemical mechanical polishing slurry further comprises an aqueous solvent, wherein the aqueous solvent comprises water.

According to an embodiment of the present invention, in the chemical mechanical polishing slurry, at least one abrasive particles is selected from the group consisting of colloidal silica, high-temperature forming silica, colloidal aluminum oxide, crystalline aluminium oxide, nano silicon carbide, and nano crystalline diamond.

According to an embodiment of the present invention, in the chemical mechanical polishing slurry, the coolant is at least one selected from the group consisting of glycol, polyethylene glycol, glycerol, and triethylene glycol.

According to an embodiment of the present invention, in the chemical mechanical polishing slurry, the oxidant is at least one selected from the group consisting of oxalic acid, citric acid, tartaric acid, salicylic acid, malic acid, sorbic acid, fumaric acid, glacial acetic acid, valeric acid, malonic acid, adipic acid, polymethacrylic acid, sodium perchlorate, sodium chlorate, sodium chlorite, sodium hypochlorite, ferric nitrate, and ferric chloride.

According to an embodiment of the present invention, in the chemical mechanical polishing slurry, the lubricity improver is at least one selected from the group consisting of sodium dodecyl sulfate, sodium laureth sulfate, sodium hexametaphosphate, polyethylene glycol octyl phenyl ether, polyethylene glycol dimethyl ether, polyethylene glycol monomethyl ether, polyethylene glycol diglycidyl ether, polyoxyethylene lauryl ether, fatty alcohol polyoxyethylene ether, polyethylene glycol trimethoxysilylpropyl ether, bisphenol A ethoxylate diacrylate, polyethylene glycol dimethacrylate, and poly(ethylene glycol) methyl ether methacrylate.

According to an embodiment of the present invention, in the chemical mechanical polishing slurry, the foam inhibitor is at least one selected from the group consisting of polydimethyl siloxane, and hexamethyldisiloxane.

According to an embodiment of the present invention, in the chemical mechanical polishing slurry, the pH adjusting agent is at least one selected from the group consisting of potassium hydroxide, sodium hydroxide, tetramethylammonium hydroxide, tetraethylammonium hydroxide, sodium carbonate, and potassium carbonate.

DETAILED DESCRIPTION OF THE PREFERRED EMBODIMENTS

For a better understanding of the aforementioned content of the present invention, preferable embodiments are illustrated in accordance as follows. The patentable scope of the present invention is not limited to these embodiments; it should be defined by the claims.

For reducing the line marks, scratches, orange peel, atomizing surface, and the like directed to the polishing compositions and polishing conditions during a series chemical mechanical polishing processes of rough polishing, medium polishing, and fine polishing, etc. of the conventional art. The present invention provides an alkaline chemical mechanical polishing slurry which can achieve a mirror gloss and defect-free polishing surface when applied to polish a stainless steel substrate, wherein the alkaline chemical mechanical polishing slurry comprises: abrasive particles; a coolant, an oxidant, a lubricity improver, and a foam inhibitor.

In order to keep the polishing slurry of the present invention in a base condition, the polishing slurry further comprises an alkaline pH adjusting agent for adjusting pH value of the polishing slurry.

It should be understood that the chemical mechanical polishing slurry of the present invention further comprises a carrier solvent, which can be water or other aqueous solvents such as deionized water.

In an embodiment of the present invention, the chemical mechanical polishing slurry is prepared by the following steps under stirring condition: adding a required content of the abrasive particles to the deionized water till the abrasive particles are dispersed and diluted in the deionized water; sequentially adding an oxidant, a lubricity improver, a foam inhibitor, and an alkaline pH adjusting agent to adjust the polishing slurry to a desired pH value; followed by adding deionized water to obtain a proper ratio of the slurry composition, such that the chemical mechanical polishing slurry of the present invention is carried out after being fully stirred.

The following stainless steel substrates are fine polished by the chemical mechanical polishing slurry according to the present invention, a surface roughness and a surface state of the polished stainless steel substrates after cleaned and dried are measured by an atomic force microscope (AFM), and a removal ratio is then obtained by a thickness measuring instrument measuring the thickness difference between before and after polishing.

A Polishing test was conducted according to the following conditions:
Polishing machine: M15P;
Platen size: 390 mm;
Polishing pad: Politex;
Head/platen speed: 75/90 rpm;
Head DF: 0.4 kgf/cm$^2$;
Polishing liquid flow rate: 15 L/min;
Polishing duration: 6 min;
Polishing slurry concentration: 10 wt %;
Wafer: stainless steel SS-304;
Wafer size (length×width×height) 37×26×0.6 mm.

Please refer to the following Tables 1-2, which collects embodiments for polishing a stainless steel substrate by using the polishing slurry as described above of the present invention.

TABLE 1

|  | Embodiment 1 | Embodiment 2 | Embodiment 3 | Embodiment 4 | Embodiment 5 | Embodiment 6 |
| --- | --- | --- | --- | --- | --- | --- |
| Abrasive particle content (wt %) | Colloidal silica 40% | Colloidal silica 30% | Colloidal silica 50% | Colloidal silica 20% | Colloidal silica 40% | Colloidal silica 10% |
| Abrasive particle size (nm) | 80 | 60 | 115 | 30 | 20 | 150 |
| Alkaline pH adjusting agent | Potassium hydroxide | Tetraethyl-ammonium hydroxide | Sodium hydroxide | Potassium hydroxide | Tetraethyl-ammonium hydroxide | Sodium carbonate |
| pH value of polishing slurry | 10 | 11 | 9.5 | 10 | 10.5 | 8.5 |
| Coolant content (wt %) | Glycerol 20% | Triethylene glycol 1.0% | Glycerol 2000 ppm | Glycol 500 ppm | Polyethylene glycol 50 ppm | Glycol 1.5% |
| Oxidant content (wt %) | Citric acid 0.05% | Oxalic acid 0.05% | Oxalic acid 0.03% | Tartaric acid 0.06% | Malonic acid 0.04% | Ferric nitrate 200 ppm + Ferric chloride 300 ppm |
| Lubricity improver content (wt %) | Sodium dodecyl sulfate 500 ppm | Sodium dodecyl sulfate 500 ppm | Sodium dodecyl sulfate 500 ppm | Polyethylene glycol diglycidyl ether 1000 ppm + Polyethylene glycol octylphenol ether 500 ppm | Sodium laureth sulfate 1000 ppm | Polyethylene glycol dimethyl ether 1500 ppm |
| Foam inhibitor content (wt %) | Polydimethyl-siloxane 500 ppm | Hexamethyl-disiloxane 500 ppm | Polydimethyl-siloxane 500 ppm | Hexamethyl-disiloxane 500 ppm | Polydimethyl-siloxane 50 ppm | Hexamethyl-disiloxane 2000 ppm |
| Surface roughness (nm) | 0.18 | 0.22 | 0.25 | 0.27 | 0.24 | 0.29 |
| Removal rate (μm/h) | 8.8 | 5.4 | 9.4 | 3.8 | 5.2 | 3.5 |
| Surface state | defect-free, mirror gloss | defect-free, mirror gloss | defect-free, mirror gloss | defect-free, mirror gloss | defect-free, mirror gloss | defect-free, mirror gloss |

TABLE 2

|  | Embodiment 7 | Embodiment 8 | Embodiment 9 | Embodiment 10 | Embodiment 11 | Embodiment 12 |
| --- | --- | --- | --- | --- | --- | --- |
| Abrasive particle content (wt %) | Poly-crystalline α-aluminum oxide 20% | Single-crystalline α-aluminum oxide 20% | Colloidal silica 40% | Colloidal silica 30% | Colloidal silica 45% | Single-crystalline α-aluminum oxide 20% |
| Abrasive particle size (nm) | 250 | 60 | 80 | 90 | 35 | 500 |

TABLE 2-continued

|  | Embodiment 7 | Embodiment 8 | Embodiment 9 | Embodiment 10 | Embodiment 11 | Embodiment 12 |
|---|---|---|---|---|---|---|
| Alkaline pH adjusting agent | Tetraethyl-ammonium hydroxide | Potassium hydroxide | Potassium hydroxide | Tetraethyl-ammonium hydroxide | Potassium hydroxide | Tetraethyl-ammonium hydroxide |
| pH value of polishing slurry | 12 | 13 | 10.5 | 9.5 | 10 | 13.5 |
| Coolant content (wt %) | Glycerol 8000 ppm | Triethylene glycol 5000 ppm | Polyethylene glycol 9000 ppm | Glycol 1.8% | Glycerol 6000 ppm | Glycerol 1.2% |
| Oxidant content (wt %) | Sodium chlorate 500 ppm + Sodium chlorite 500 ppm | Glacial acetic acid 50 ppm | Salicylic acid 2500 ppm | Sorbic acid 3500 ppm | Adipic acid 1500 ppm | Polymethacrylic acid 1.0% |
| Lubricity improver content (wt %) | Polyethylene glycol dimethacrylate 400 ppm | Polyethylene glycol trimethoxy-silylpropyl ether 200 ppm | Poly(ethylene glycol) methyl ether methacrylate 800 ppm | Bisphenol A ethoxylate diacrylate 10 ppm | Polyethylene glycol dimethacrylate 500 ppm + Poly(ethylene glycol) methyl ether methacrylate 500 ppm | Hexameta-phosphate 5000 ppm |
| Foam inhibitor content (wt %) | Polydimethyl-siloxane 1000 ppm | Hexamethyl-disiloxane 100 ppm | Polydimethyl-siloxane 5000 ppm | Hexamethyl-disiloxane 10 ppm | Polydimethyl-siloxane 800 ppm | Hexamethyl-disiloxane 200 ppm |
| Surface roughness (nm) | 0.32 | 0.31 | 0.21 | 0.33 | 0.25 | 0.28 |
| Removal rate (μm/h) | 13.5 | 14.8 | 3.6 | 2.8 | 3.0 | 12.2 |
| Surface state | defect-free, mirror gloss | defect-free, mirror gloss | defect-free, mirror gloss | defect-free, mirror gloss | defect-free, mirror gloss | defect-free, mirror gloss |

In the above described embodiments, the abrasive particles are regarded as the main composition of the polishing slurry. Based on the total weight of the polishing slurry, a content of the abrasive particles is in a range of 10 wt % to 50 wt %, preferably from 20 wt % to 45 wt %, and more preferably from 27 wt % to 42 wt %; a particle size of the abrasive particles is in a range of 20 nm to 500 nm, preferably from 30 nm to 400 nm, and more preferably from 50 nm to 350 nm.

Since the selection of abrasive particles will affect the removal rate and the surface quality of the substrate, except the colloidal silica and the crystalline aluminium oxide described above in the embodiments, the abrasive particles can also be at least one selected from the group consisting of high-temperature forming silica, colloidal aluminum oxide, crystalline phase aluminium oxide, nano silicon carbide, and nano crystalline diamond.

In the above described embodiments, the coolant is a polishing coolant used for accelerating the cooling degree when polishing the substrate, such that the temperature influence on the removal rate and the surface roughness of the stainless steel substrate during a chemical mechanical polishing process can be reduced. The coolant is at least one selected from the group consisting of glycol, polyethylene glycol, glycerol, and triethylene glycol. A content of the coolant based on the total weight of the polishing slurry is in a range of 0.001 wt % to 2.0 wt %, preferably from 0.01 wt % to 0.8 wt %, and more preferably from 0.1 wt % to 1.5 wt %.

In the above described embodiments, the oxidant is used for oxidizing a surface of the substrate, and forming an oxide film to improve its polishing selectivity, a content of the oxidant based on the total weight of the polishing slurry is in a range of 0.001 wt % to 1.0 wt %, preferably from 0.01 wt % to 0.8 wt %, and more preferably from 0.03 wt % to 0.6 wt %. Except for the oxalic acid, citric acid, tartaric acid, malic acid, fumaric acid, glacial acetic acid, malonic acid, adipic acid, polymethacrylic acid, sodium chlorate, sodium chlorite, ferric nitrate and ferric chloride shown in Tables 1 and 2, the oxidant also can be at least one selected from the group consisting of salicylic acid, sorbic acid, valeric acid, sodium perchlorate, and sodium hypochlorite.

In the above described embodiments, the lubricity improver is used to enhance the polishing lubricity and smoothness during a polishing process, a content of the lubricity improver based on the total weight of the polishing slurry is in a range of 10 ppm to 5000 ppm, preferably from 50 ppm to 4000 ppm, and more preferably from 200 ppm to 3000 ppm. Except for the sodium dodecyl sulfate, sodium laureth sulfate, sodium hexametaphosphate, polyethylene glycol octyl phenyl ether, polyethylene glycol dimethyl ether, polyethylene glycol diglycidyl ether, bisphenol A ethoxylate diacrylate, polyethylene glycol dimethacrylate, polyethylene glycol trimethoxysilylpropyl ether, and poly(ethylene glycol) methyl ether methacrylate shown in Tables 1 and 2, the lubricity improver also can be at least one selected from the group consisting of polyethylene glycol monomethyl ether, polyoxyethylene lauryl ether, and fatty alcohol polyoxyethylene ether.

In the above described embodiments, the foam inhibitor is capable of further removing the foam generated in the polishing process due to contact with air. The foam inhibitor can be at least one selected from the group consisting of polydimethyl siloxane and hexamethyldisiloxane. A content of the foam inhibitor based on the total weight of the polishing slurry is in a range of 10 ppm to 5000 ppm, preferably from 50 ppm to 4000 ppm, and more preferably from 100 ppm to 2000 ppm.

In the above described embodiments, except for the potassium hydroxide, sodium hydroxide, sodium carbonate, and potassium carbonate shown in Tables 1 and 2, the alkaline pH adjusting agent can also be at least one selected from the group consisting of tetramethylammonium hydroxide and tetraethylammonium hydroxide. The pH value of the polishing slurry according to the present invention is in a range of 8.5 to 13.5, preferably from 9 to 13, and more preferably from 9.5 to 11.5.

As shown in Tables 1 and 2, the surface roughness of the stainless steel substrate can be controlled down to 0.33 mm or less, and the removal rate can reach 14.8 μm/h when the composition of the polishing slurry is adjusted under the above parameters. Furthermore, the surface of the stainless steel substrate is defect-free and mirror glossed.

Please refer to Table 3, which contrasts examples for polishing stainless steel substrates without using the chemical mechanical polishing slurry of the present invention. The polishing conditions for the contrast examples are the same as that of the embodiments of the present invention, which will not be described herein.

to the stainless steel substrate in the aspects of surface roughness and removal rate, the polishing slurry can not only reach a defect-free and mirror gloss surface of the stainless steel substrate after the rough and medium polishing steps, but is also available to provide a surface passivation effect on the substrate surface after polishing, such that the mirror gloss after the polishing step can be maintained for a long time. Compared to the prior art, the alkaline polishing slurry of the present invention can enhance polishing performance, surface quality (defect-free), and provide a protective benefit for the surface of the stainless steel substrate after a series of chemical mechanical polishing processes.

The embodiments were chosen and described in order to explain the principles of the disclosure and their practical

TABLE 3

| | Contrast example 1 | Contrast example 2 | Contrast example 3 | Contrast example 4 | Contrast example 5 | Contrast example 6 | Contrast example 7 |
|---|---|---|---|---|---|---|---|
| Abrasive particle content (wt %) | Colloidal silica 5% | Colloidal silica 40% | Colloidal silica 40% | Colloidal silica 40% | Colloidal silica 40% | Colloidal silica 40% | Colloidal silica 40% |
| Abrasive particle size (nm) | 80 | 16.5 | 80 | 80 | 80 | 80 | 80 |
| Alkaline pH adjusting agent | Tetraethyl-ammonium hydroxide | Potassium hydroxide | Tetraethyl-ammonium hydroxide | Potassium hydroxide | Potassium hydroxide | Tetraethyl-ammonium hydroxide | Potassium hydroxide |
| pH value of polishing slurry | 10 | 10 | 8 | 10 | 10 | 10 | 10 |
| Coolant content (wt %) | Glycerol 1000 ppm | Glycerol 1000 ppm | Glycerol 1000 ppm | N/A | Glycerol 1000 ppm | Glycerol 1000 ppm | Glycerol 1000 ppm |
| Oxidant content (wt %) | Citric acid 0.05% | Citric acid 0.05% | Citric acid 0.05% | Citric acid 0.05% | N/A | Citric acid 0.05% | Citric acid 0.05% |
| Lubricity improver content (wt %) | Sodium dodecyl sulfate 500 ppm | Sodium dodecyl sulfate 500 ppm | Sodium dodecyl sulfate 500 ppm | Sodium dodecyl sulfate 500 ppm | Sodium dodecyl sulfate 500 ppm | N/A | Sodium dodecyl sulfate 500 ppm |
| Foam inhibitor content (wt %) | Polydimethyl-siloxane 500 ppm | Polydimethyl-siloxane 500 ppm | Polydimethyl-siloxane 500 ppm | Polydimethyl-siloxane 500 ppm | Polydimethyl-siloxane 500 ppm | Polydimethyl-siloxane 500 ppm | N/A |
| Surface roughness (nm) | 13.8 | 1.72 | 0.71 | 1.54 | 1.45 | 1.19 | 0.76 |
| Removal rate (μm/h) | 0.5 | 0.3 | 1.6 | 1.2 | 2.6 | 2.4 | 2.8 |
| Surface state | Line marks, scratches | Line marks, scratches, orange peel | Orange peel, atomization | Line marks, scratches, orange peel | line marks, orange peel | Scratches, orange peel | Orange peel, atomization |

As shown in the contrast examples of Table 3, when the particle size of the abrasive particles, the pH value, the oxidant, the lubricity improver, and the foam inhibitor of the polishing slurry are different from the control parameters of the present invention, the surface roughness of stainless substrates will be enhanced, the removal rate will be reduced, and defects such as line marks, scratches, orange peels, and atomizing surfaces will be caused on the surface of the stainless steel substrate. For example, the content of the abrasive particles in contrast example 1 is less than 10 wt % as defined in the present invention; the particle size of the abrasive particle in contrast example 2 is less than 20 nm as defined in the present invention; the PH value of the polishing slurry in contrast example 3 is lower than 8.5 as defined in the present invention; and in the contrast examples 4-7, the polishing slurries are lacking the coolant, oxidant, lubricity improver, and foam inhibitor as required in the present invention, therefore the polishing quality is damaged.

The alkaline chemical mechanical polishing slurry of the present invention demonstrates an excellent polishing effect application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present invention is defined by the appended claims rather than the foregoing description and the exemplary embodiments described therein.

What is claimed is:

1. A chemical mechanical polishing slurry having a pH value in a range of 8.5 to 13.5, and comprising:
    abrasive particles with a content of 10 wt % to 50 wt %;
    a coolant with a content of 0.001 wt % to 2.0 wt %;
    an oxidant with a content of 0.001 wt % to 1.0 wt %;
    a lubricity improver with a content of 10 ppm to 5000 ppm; and
    a foam inhibitor with a content of 10 ppm to 5000 ppm,
        wherein a particle size of the abrasive particles is in a range of 20 nm to 500 nm; the lubricity improver is bisphenol A ethoxylate diacrylate; the polishing slurry is used for a chemical mechanical polishing on a stainless steel substrate.

2. The chemical mechanical polishing slurry as claimed in claim 1 further comprising a pH adjusting agent.

3. The chemical mechanical polishing slurry as claimed in claim 1 further comprising an aqueous solvent.

4. The chemical mechanical polishing slurry as claimed in claim 1, wherein the abrasive particles are at least one selected from the group consisting of colloidal silica, high-temperature forming silica, colloidal aluminum oxide, crystalline aluminium oxide, nano silicon carbide, and nano crystalline diamond.

5. The chemical mechanical polishing slurry as claimed in claim 1, wherein the coolant is at least one selected from the group consisting of glycol, polyethylene glycol, glycerol, and triethylene glycol.

6. The chemical mechanical polishing slurry as claimed in claim 1, wherein the oxidant is at least one selected from the group consisting of oxalic acid, citric acid, tartaric acid, salicylic acid, malic acid, sorbic acid, fumaric acid, glacial acetic acid, valeric acid, malonic acid, adipic acid, polymethacrylic acid, sodium perchlorate, sodium chlorate, sodium chlorite, sodium hypochlorite, ferric nitrate, and ferric chloride.

7. The chemical mechanical polishing slurry as claimed in claim 1, wherein the foam inhibitor is at least one selected from the group consisting of polydimethyl siloxane, and hexamethyldisiloxane.

8. The chemical mechanical polishing slurry as claimed in claim 1, wherein the pH adjusting agent is at least one selected from the group consisting of potassium hydroxide, sodium hydroxide, tetramethylammonium hydroxide, tetraethylammonium hydroxide, sodium carbonate, and potassium carbonate.

* * * * *